(12) United States Patent
Story, Jr.

(10) Patent No.: US 6,612,790 B1
(45) Date of Patent: Sep. 2, 2003

(54) HOUSING RETROFIT FOR VERTICAL MILLING MACHINE

(76) Inventor: Paul J. Story, Jr., 812 E. Worthington Ave., Charlotte, NC (US) 28203

( * ) Notice: Subject to any disclaimer, the term of this patent is extended or adjusted under 35 U.S.C. 154(b) by 0 days.

(21) Appl. No.: 10/222,252

(22) Filed: Aug. 16, 2002

Related U.S. Application Data

(60) Provisional application No. 60/312,969, filed on Aug. 16, 2001.

(51) Int. Cl.[7] .............................. B23C 1/12; B23C 7/60
(52) U.S. Cl. ...................... 409/218; 409/214; 408/136; 408/236
(58) Field of Search ................................ 409/218, 214; 408/241 S, 16, 135, 136, 234, 236

(56) References Cited

U.S. PATENT DOCUMENTS

| | | | |
|---|---|---|---|
| 5,286,147 A | * | 2/1994 | Escobedo et al. ........... 409/218 |
| 5,330,298 A | * | 7/1994 | Welch et al. ............... 408/136 |
| 5,634,748 A | * | 6/1997 | Brazell et al. .............. 408/236 |
| 5,941,663 A | * | 8/1999 | Elrod et al. ................. 409/214 |
| 5,947,664 A | * | 9/1999 | Espinosa ..................... 409/218 |
| 6,095,728 A | * | 8/2000 | Howie ........................ 409/214 |

* cited by examiner

*Primary Examiner*—A. L. Wellington
*Assistant Examiner*—Dana Ross
(74) *Attorney, Agent, or Firm*—Dougherty, Clements & Hofer

(57) ABSTRACT

The present invention is a retrofit apparatus for attachment to vertical milling machines. The invention generally comprises a main scale, a digital indicator, a mounting cover having a centrally located aperture for receiving the indicator and allowing vertical movement thereof, a plurality of hat clips and screws to attach the scale and indicator to the mounting cover, a rear mounting plate, a quill stop bar, a quill mount, and a rod. In operation, as the quill device of a milling machine is moved, the indicator slides up and down within the aperture and the indicator effectively and precisely measures the vertical displacement thereof. In an alternative embodiment of the invention, the retrofit apparatus comprises an aperture in the mounting cover wherein the aperture is substantially the same size as the indicator, and in operation only the scale moves while the indicator measures the vertical displacement of the quill.

12 Claims, 10 Drawing Sheets

Prior Art

Prior Art

*Fig.4*
*Fig.5*
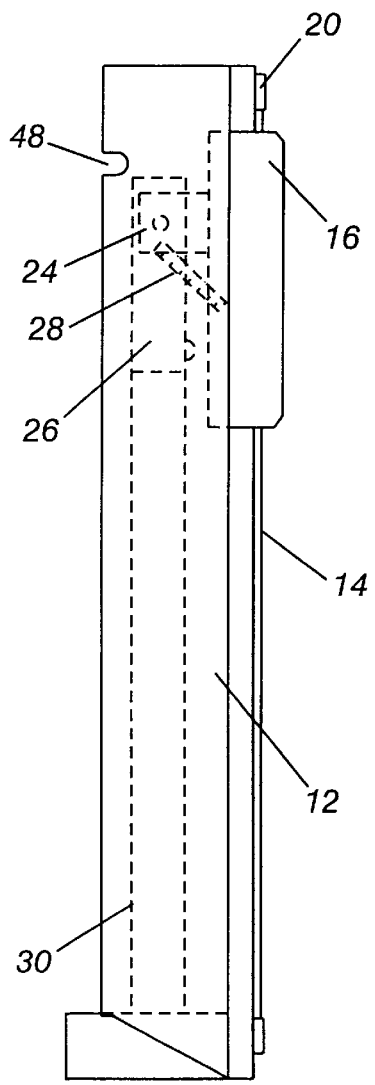
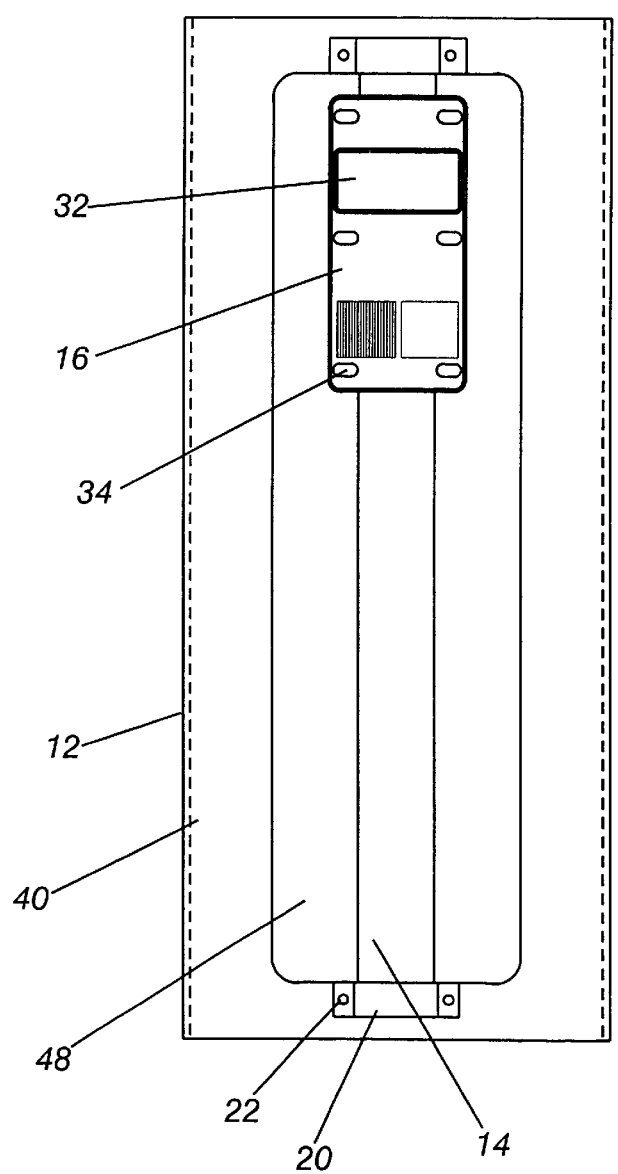

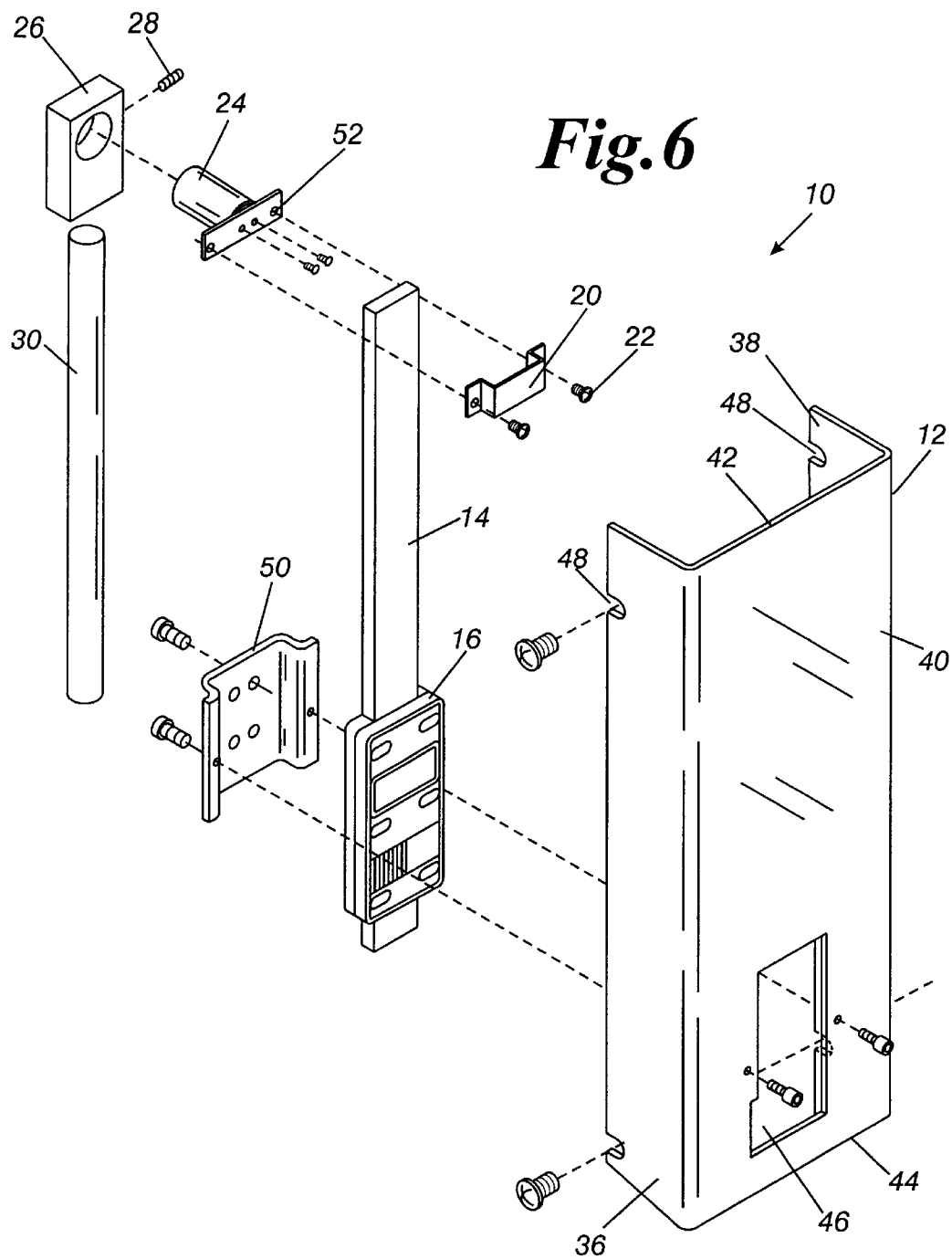

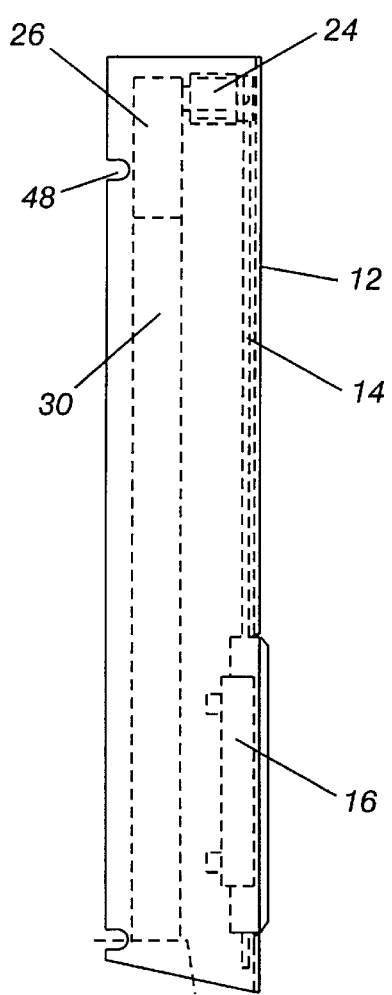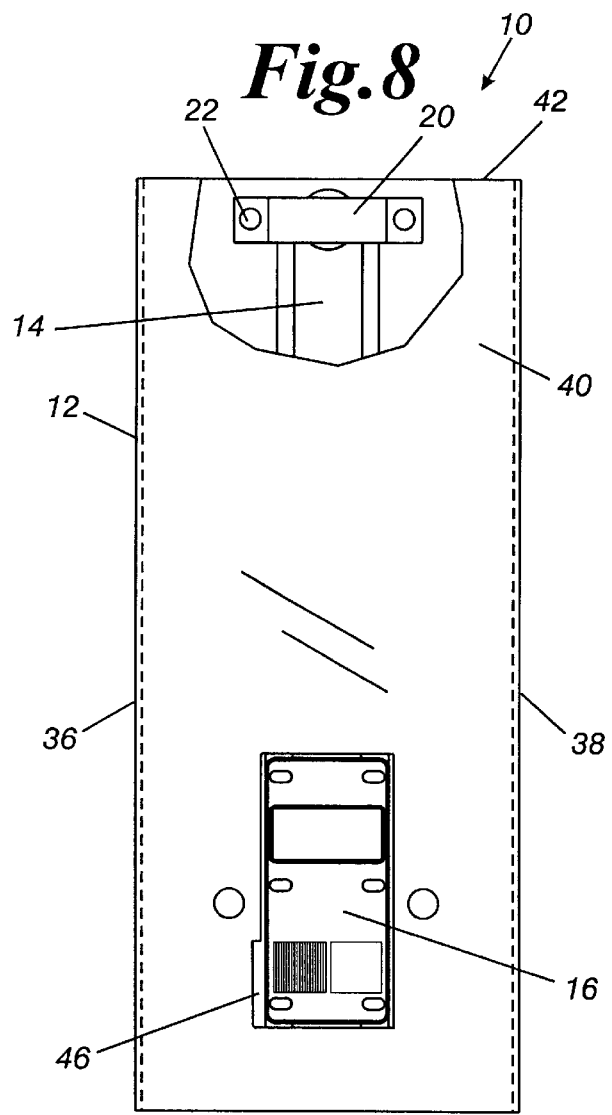

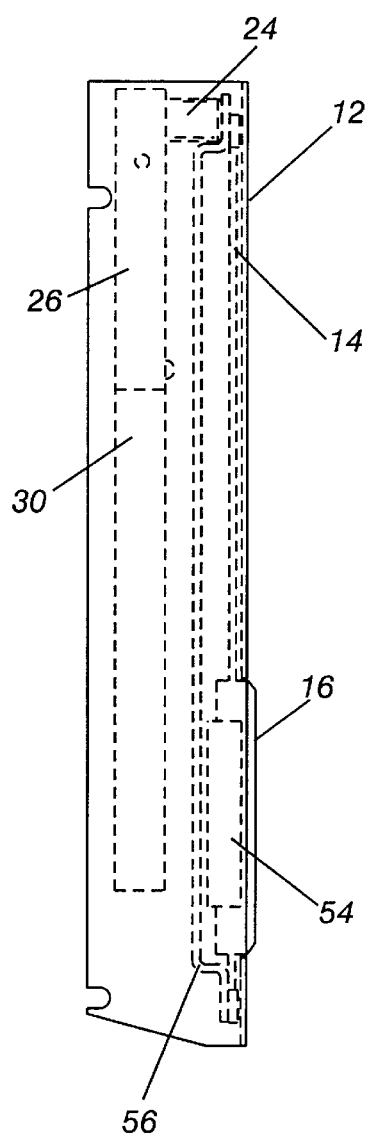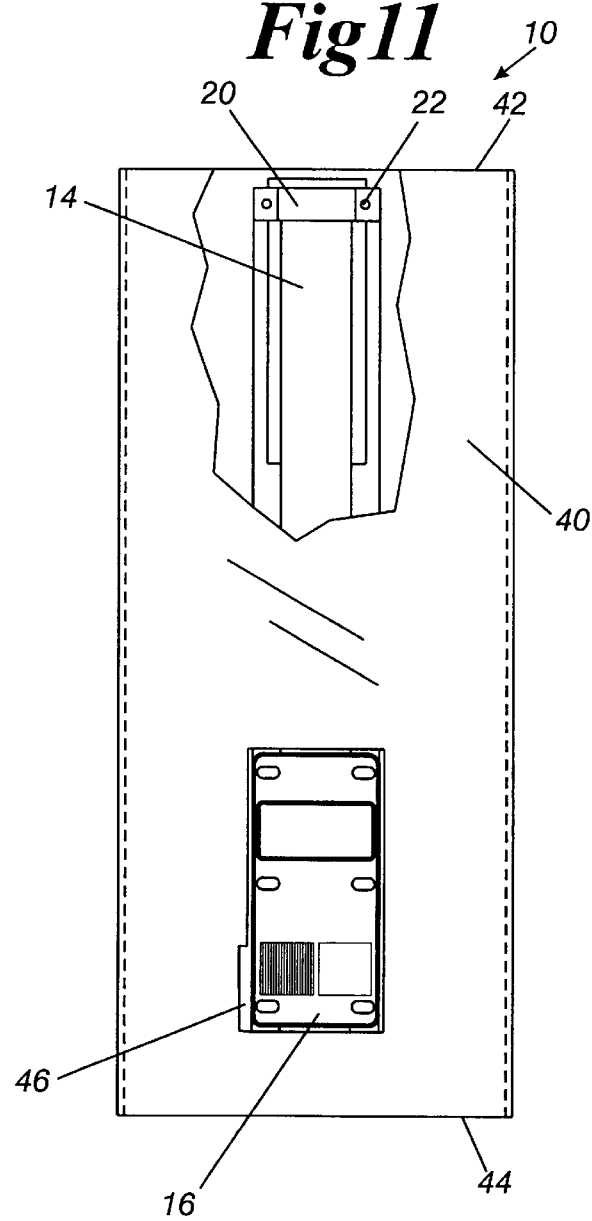

HOUSING RETROFIT FOR VERTICAL MILLING MACHINE

CROSS REFERENCE TO RELATED APPLICATION

This application claims the benefit of U.S. Provisional Application No. 60/312,969, filed Aug. 16, 2001.

FIELD OF THE INVENTION

The present invention relates generally to attachments for machine tools. More particularly, the invention concerns a housing assembly that is adapted and retrofitted for use with vertical milling machines to measure the vertical travel, or milling depth, of a quill mechanism.

BACKGROUND

Vertical milling machines are known in the art and a number of different types of milling machines are commercially available. By way of example, Bridgeport® and RF Rong Fu® produce various models of milling machines. These commercially available milling machines are generally classified into two main divisions, vertical and horizontal. In the horizontal milling machines, the cutter is horizontally mounted to a spindle and moves in a horizontal manner. Similarly, in a vertical milling machine, the cutter is vertically disposed and moves in a vertical fashion.

A conventional vertical milling machine generally includes a table on which a workpiece can be supported, and a quill that supports a tool or cutter for movement toward and away from the table for milling the workpiece. Typically, the table is adjustable within the horizontal plane from side to side and from front to back relative to the quill. Although many milling machines are manual, in the sense that adjustment of the table and movement of the quill is manually achieved, improvements in the art have been made for fully automated machines. These automated machines provide some advantages over manual machines, however, they are considerably more expensive for users. Moreover, they lack the versatility of manual machines.

In addition to the above, many of the manual, vertical milling machines commercially available provide an already attached manual measuring apparatus for determining the vertical travel, or milling depth, of the quill. By way of example, RF Rong Fu® milling machines provide a plastic assembly located on the face of the machine. The assembly comprises a housing attached to the milling machine and a moveable indicator attached to a quill shaft stop bar. The housing further has a rectangular hole which is centrally located thereon and a measurement scale surrounding the hole. As the quill is lowered and raised the indicator points to a corresponding measurement on the measurement scale, thereby informing a user of the approximate vertical movement or depth.

A disadvantage of the current measuring devices provided in milling machines is that they do not provide precise measurements. Typically, the units of measure on the devices are not small enough and one's ability to properly bore holes and mill workpieces is restricted. An example of an industry that thus is restricted is the steel industry, in which machined parts must be milled to precise tolerances. The measuring units currently provided simply do not and cannot accurately measure pieces to ensure that certain hole depths meet those tolerances. Thus, a need exists for an apparatus which provides a precise measurement of the depth or vertical movement of a quill.

Currently, there exist some measuring devices which accurately determine the vertical movement of the quill. However, for various reasons, these devices are ineffective to accomplish the objects stated herein. For example, the Mitutoyo Corporation manufactures the Digimatic Quill Kit for vertical Bridgeport® milling machines and Bridgeport® type machines. The Quill Kit essentially is a retrofitted housing comprising a main scale, a digital display indicator attached to the front surface of the main scale, a rear support plate secured to the rear of the indicator, thereby securing the indicator to the main scale, a tapped hole mounting bracket which is attached to the scale, a base, a scale stop bar that is mounted to the rear plate, a scale stop bracket and a plurality of screws and washers. The Quill Kit unit is attached to a milling machine by first retracting the spindle of the machine and removing the quill wheel. Vernier scale screws of the milling machine are removed and the base is placed over the vernier scale. The vernier screws are replaced and the mounting bracket is attached to the base. Thereafter, the scale is attached to the mounting bracket by the scale stop bracket.

A disadvantage of the Quill Kit is that it is only useful for Bridgeport® type machines. The device simply cannot be used on other types of milling machines, such as the RF Rong Fu® models. Moreover, the Quill Kit is comprised of many unnecessary components. As such, it is expensive to manufacture.

Thus, it is clear that a need exists for an inexpensive, simple and versatile retrofit apparatus for vertical milling machines which is capable of accomplishing the stated tasks.

SUMMARY OF THE INVENTION

The present invention is a retrofit apparatus for vertical milling machines which generally comprises a mounting cover, a main scale, an indicator, a rear plate, a plurality of hat clips, a plurality of screws, a quill stop bar, a set screw, a quill stop mount and a graduated rod. The main scale is slidably attached to the rear of the indicator. The rear plate is connected to the rear surface of the indicator by a plurality of screws with the scale displaced therebetween. The mounting cover of the present invention has a generally rectangular configuration. Further, the mounting cover has a generally elongated rectangular aperture, substantially and centrally located therein. The length of the aperture extends along the length of the mounting cover face. The scale, indicator, and rear plate are secured to the face of the mounting cover by a plurality of hat clips. The components are secured so that the indicator is fixed within the aperture of the mounting cover and slidably moves in concert with the quill.

Attachment of the assembly to the quill stop bar and quill stop mount is accomplished by screwing the rear plate to the quill stop bar and inserting the quill stop bar into an aperture in the quill stop mount. A graduated rod is provided for connection to the quill stop mount, thereby allowing the slide support and scale to slidably move up and down. The entire assembly is then fixed to a milling machine by a plurality of screws which are matingly inserted into a plurality of corresponding receiving holes located on the milling machine and the left and right sides of the mounting cover.

In an alternative embodiment, the invented retrofit generally comprises a mounting cover, a main scale, an indicator, a slide support, a clamp mount, a plurality of hat clips, a plurality of screws, a quill stop bar, a quill stop mount and a graduated rod. The main scale is slidably attached to the rear of the indicator. The slide support bracket is connected to the rear surface of the scale by a plurality of hat clips and screws which partially cover the ends of the front surface of the scale. The mounting cover of the present invention has a generally rectangular configuration. Further, the mounting cover has a generally rectangular aperture, having a substantially similar configuration as the indicator, located at the bottom end of its face. The scale, indicator, and slide support are secured to the mounting cover by a clamp mount, which is disposed between the indicator and the slide support. The components are secured so that the indicator is fixed within the aperture of the mounting cover.

Attachment of the assembly to the quill stop bar and quill stop mount of the alternative embodiment is accomplished by screwing the slide support to the quill stop bar and inserting the quill stop bar into an aperture in the quill stop mount. A graduated rod is provided for connection to the quill stop mount, thereby allowing the slide support and scale to slidably move up and down. The entire assembly is then fixed to a milling machine by a plurality of screws which are matingly inserted into a plurality of corresponding receiving holes located on the milling machine and the left and right sides of the mounting cover.

In another alternative embodiment of the present invention, the retrofit comprises a mounting cover, a main scale, an indicator, a rear plate, a hat clip clamp mount, a quill stop, a mount and a quill shaft. The aperture of the mounting cover is of a corresponding size to the indicator. The main scale is slidably mounted to the indicator by the rear plate. Thereafter, the indicator and scale are attached to the mounting cover by the clamp mount. In addition, the indicator and scale are fixed to the quill shaft and quill stop at the mount. Subsequently, the entire assembly is joined to the milling machine by a plurality of screws which connect the two by a plurality of corresponding holes located on the milling machine and the left and right sides of the mounting cover.

In a still further embodiment of the present invention, a second generally elongated aperture is present along side the aperture. The second aperture is of a shorter length and runs parallel to the aperture. Displaced within the second aperture is a hard stop block having a T-bolt configuration. The hard stop block has an additional lock lever which, when engaged allows a user to set the block along the second aperture at a predetermined point. In operation, the user moves the hard stop block to a desired location on the second aperture and locks it in place. Thereafter, once the quill is extended, the rear plate contacts the hard stop block and resists further extension. This feature allows the user to mill multiple workpieces at a consistent depth.

OBJECTS OF THE INVENTION

Accordingly, a principal object of the present invention is to provide a retrofit apparatus for milling machines which accurately and economically measures the vertical movement of a quill during operation.

A further, and more particular, object of the invention is to provide a simple housing assembly that can be adapted and retrofitted to various milling machines, and which housing assembly can provide a more precise measurement of vertical travel of a quill during operation than can be done currently.

Another object of the invention is to provide a sturdy and durable housing assembly for measuring the precise vertical movement of a quill during operation.

BRIEF DESCRIPTION OF THE DRAWINGS

In view of these and other objects which will more readily appear as the nature of the invention is better understood, the invention consists in the novel combination and arrangement of parts hereinafter more fully described, illustrated and claimed with reference being made to the attached drawings, in which:

FIG. 4 is a side view of the invented housing assembly of FIG. 3;

FIG. 5 is a front view of the invented housing assembly of FIG. 3;

FIG. 6 is an exploded isometric view of an alternative embodiment of the housing assembly of FIG. 3;

FIG. 7 is a side view of the alternative embodiment of the housing assembly of FIG. 6;

FIG. 8 is a front view of the alternative embodiment of the housing assembly of FIG. 6;

FIG. 10 is a side view of the further alternative embodiment of the housing assembly of FIG. 9;

FIG. 11 is a front view of the further alternative embodiment of the housing assembly of FIG. 9.

DETAILED DESCRIPTION

Figure 1:
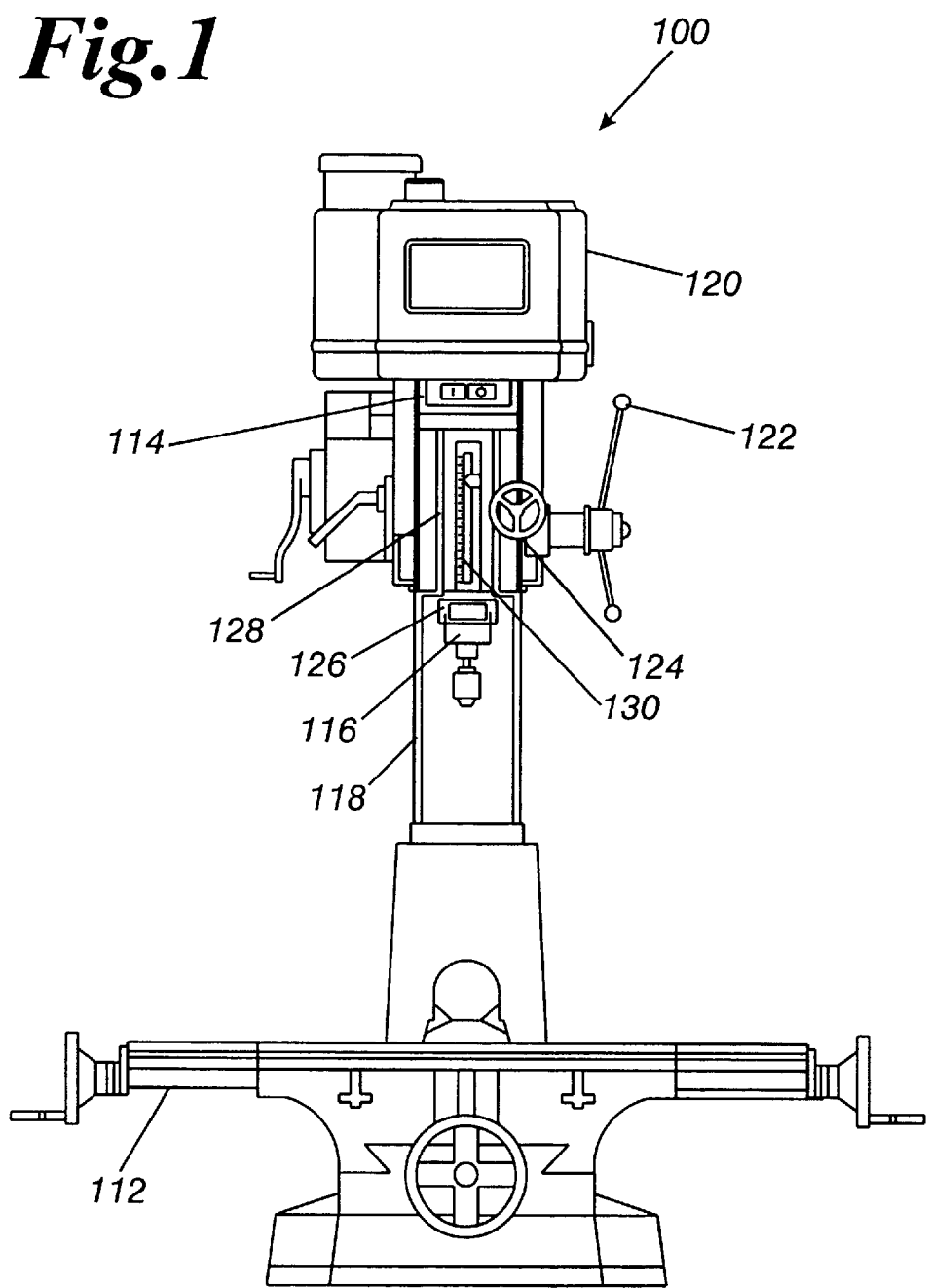
FIG. 1 is a front view of a prior art conventional vertical milling machine.
Figure 2:
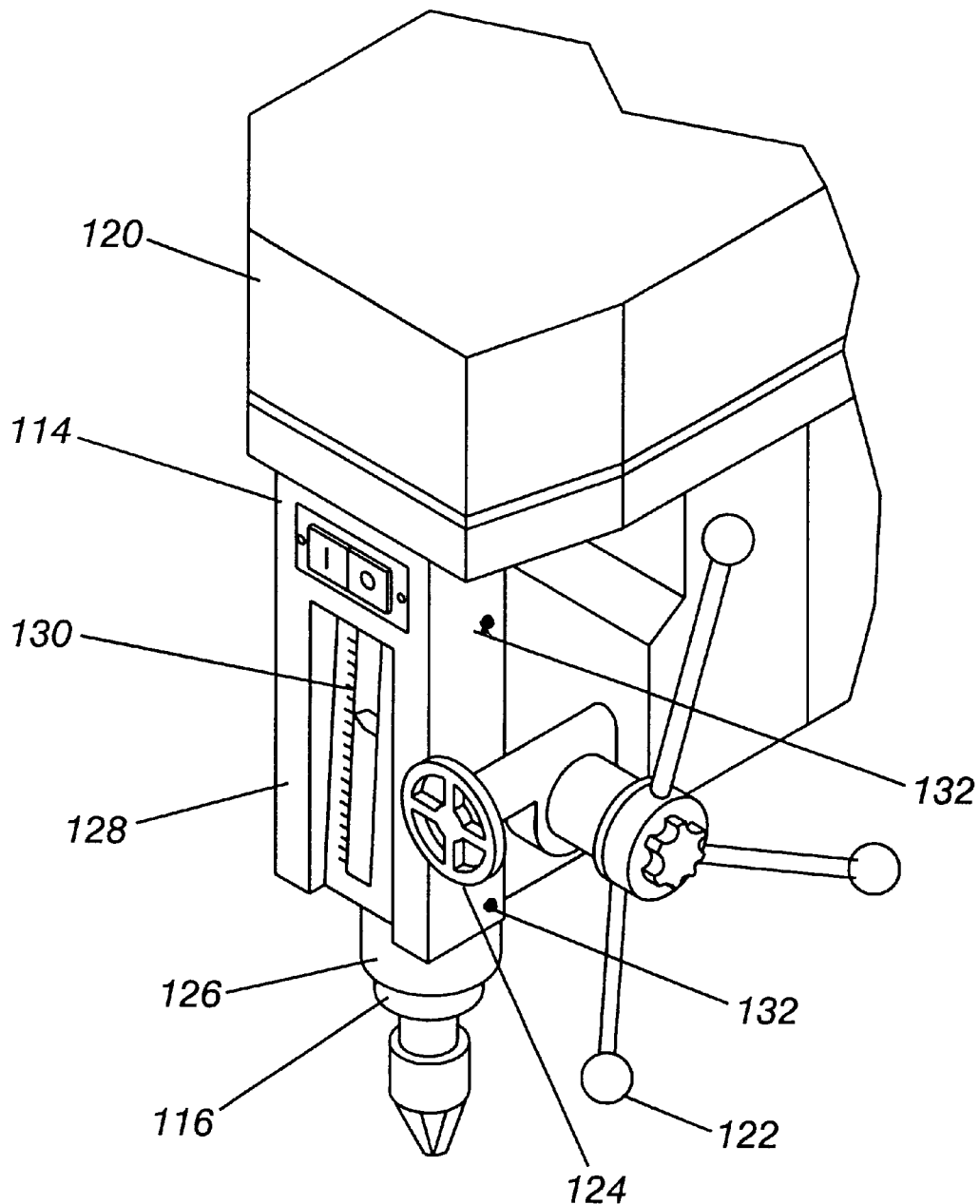
FIG. 2 is a fragmentary view of the prior art milling machine shown in FIG. 1.

A conventional vertical milling machine 100 is shown in FIGS. 1 and 2, and generally includes a frame presenting a table 12 and a quill head 14 overlying the table 112, and a quill 116 supported on the head 114 for rotation and for relative shiftable movement along a central longitudinal axis thereof toward and away from the table 112 between retracted and extended positions.

The frame includes an upstanding column 118 which supports the quill 116 and head 114, and a knuckle (not shown) supported on the column 118 for pivotal movement about a transverse, horizontally extending shaft (not shown). The knuckle is secured in place relative to the column 118 by a plurality of bolts which can be loosened to enable orientation of the knuckle to be adjusted about the shaft. The head 114, in turn, is mounted on the knuckle for pivotal movement about a horizontal axis that is perpendicular to the axis of the shaft. Angular adjustment of the quill 116 about the X and Y axes can be achieved in order to orient the quill 116 at any desired angle relative to the table 112.

A motor 120 is mounted on the head 114 for driving rotation of the quill 116, and a manual feed lever 122 is connected to the quill 116 through a rack and pinion quill feed transmission so that when the lever 112 is shifted, the quill 116 is moved between the retracted and extended positions. The motor 120 is connected to the quill 116 through a suitable transmission arrangement for automatically extending the quill 116 when the transmission is engaged. The feed transmission arrangement includes a quill feed engagement control lever 124 that protrudes from a boss on the right side of the quill head 114 for permitting an operator to engage and disengage the feed transmission, as desired. A cover is normally held in place over the quill head 114 that can be removed to allow access to the transmission components within the head 114.

The feed transmission of the motor 120 includes a feed kick-out mechanism for disconnecting the quill 116 from the feed drive of the motor 120 when the quill 116 has been extended by a distance preset by the user. The feed kick-out mechanism includes a depth stop screw (not shown) supported between the quill head 114, a depth stop block received around a stop screw (not shown) and the quill 116. A travel stop ring 126 is threaded onto the stop screw for adjustment along the length thereof. When the quill feed engagement control lever 124 is moved to the engaged position, the quill 116 is moved automatically toward the extended position by the motor 120 and the depth stop block travels along the depth stop screw until the block engages the travel stop ring 126. The force of the stop block against the ring 126 trips the engagement lever 124 and the feed transmission between the motor 120 and the quill 116 is disconnected.

A scale box 128 is centrally mounted over the quill head 114 with a manual scale 130 disposed therein to allow a machinist to gauge the depth of the quill 114, and to set the position of the travel stop ring 126 so that drive to the quill 114 is disconnected at the desired depth. The scale box 128 has a generally elongated rectangular aperture for receiving the scale 130. The scale box 128 is fixed to the milling machine 100 at predetermined connection points 132. The connection points 132 are preferably threaded holes located in the milling machine 100 and are adapted to receive screws which secure the scale box 128 in place.

The vertical milling machine thus far described is a conventional knee mill, e.g. of the type manufactured by RongFu Corporation. Similar machines are made by several other manufacturers around the world, such as Bridgeport®, and the housing retrofit of the present invention can be adapted for use on any of these conventional machines without departing from the scope of the present invention.

Figure 3:
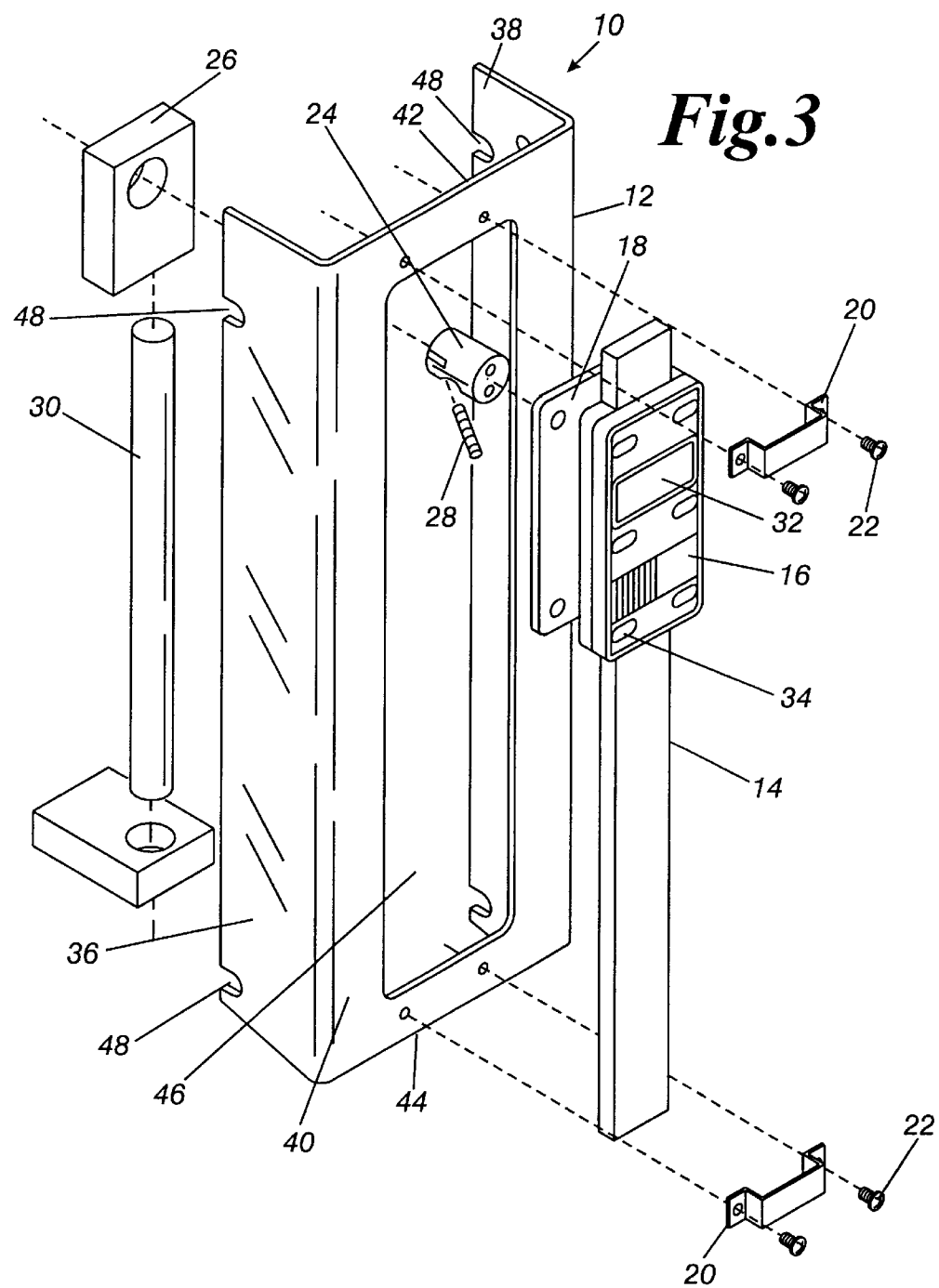
FIG. 3 is an isometric exploded view of a housing assembly of the present invention.

Referring now to the drawings, FIGS. 3–5 show a preferred embodiment of the invented retrofit apparatus 10. The retrofit apparatus 10 generally comprises a mounting cover or housing 12 having a generally rectangular face configuration, a main scale 14, an indicator 16, a rear indicator plate 18, a plurality of hat clips 20, a plurality of screws 22, a cylindrical quill stop bar 24, a quill stop mount 26 which is adapted to receive the quill stop bar 24, a set screw 28, and a cylindrical graduated rod 30.

The included indicator 16 is a digital displacement indicator. An example of the indicator is such as that produced by the Mitutoyo Corporation for indicating the depth of holes, slots and countersinks. The indicator 16 generally includes an indicator head having a digital readout 32 and a plurality of control buttons 34. The indicator 16 further includes an attachment means whereby it can be secured to the main scale 14 by attachment screws (not shown). It will be appreciated by those skilled in the art that while the Mitutoyo Corporation device is stated as an exemplary model which may be used in the present invention, other suitable digital displacement indicators may be used.

The mounting cover 12 is preferably made of aluminum or steel and has a left side 36, a right side 38, a face 40, a top end 42 and a bottom end 44. It will be appreciated by those skilled in the art that the mounting cover 12 may be made of other suitable materials which can accomplish the objects stated herein. Further, the face 40 of the mounting cover 12 has a generally rectangular aperture 46 located therein. The aperture 46 of the face 40 has a width corresponding to that of the indicator 16. However, the length of the aperture 46 substantially extends to the top and bottom ends 42 and 44 of the mounting cover 12, thereby allowing the indicator 16 to slidably move along the scale 14. Located on the mounting cover's left and right sides, 36 and 38 respectively, are attachment notches 48 for attaching the retrofit apparatus 10 to a milling machine 100.

The main scale 14 has a generally elongated rectangular configuration and is formed so that the indicator 16 can be slidably mounted thereto. The scale 14 is secured to the outer surface of face 40 of the mounting cover 12 by the plurality of hat clips 20. Further still, the indicator 16 is slidably mounted to the scale 14 by the rear plate 18. Attached to the rear plate 18 at one end is the quill stop bar 24 which is matingly engaged with the quill stop mount 26 at its opposing end. The quill stop mount 26 is adapted to receive the cylindrical graduated rod 30.

After the scale 14 and indicator 16 are attached to the mounting cover 12, they are attached to the quill stop bar 24 via the rear plate 18. The quill stop bar 24 is, in turn, matingly connected to the quill stop mount 26 at the upper end of its front surface. The quill stop bar 24 is secured in place by the set screw 28 which is received in an angular cavity located on the stop bar 24. Thereafter, the graduated rod 30 is also matingly connected to the quill stop mount 26 at its bottom surface. The retrofit apparatus 10 is then fixed to the milling machine 100 by a plurality of screws (not shown) which connect the two by predetermined connection points 132 located on the milling machine 100 and the left and right sides, 36 and 38, of the mounting cover 12.

In operation, as a drill feed control lever 124 on the milling machine 100 is effectuated, the quill 116 is vertically lowered to a workpiece on the table 112 and the indicator 16 positively and precisely measures the vertical travel, or depth, of the movement and digitally displays the unit of measure. Once the quill 116 is lowered to a predetermined depth limit, the quill stop bar 24 prevents further downward movement.

Referring to FIGS. 6–8, an alternative embodiment of the retrofit apparatus 10 is shown. The retrofit 10 comprises a mounting cover 12 having a left side 36, a right side 38, a face 40, a top end 42 and a bottom end 44. Again, the mounting cover 12 has a generally rectangular configuration and is preferably comprised of aluminum or steel. However, it will be appreciated by those skilled in the art that other, similar materials may be employed. Further, the face 40 has a generally rectangular aperture 46 located at the bottom end 44 of the mounting cover 12. The retrofit 10 further comprises a main scale 14, an indicator 16, a hat clip clamp mount 50, a cylindrical quill stop 24, and a stop mount 26. The aperture 46 in the face 40 is of a corresponding size to the indicator 16.

Similar to the first embodiment, the main scale 14 is a generally rectangular device formed so that the indicator 16 can be slidably mounted to the front surface thereof. The indicator 16 is slidably attached to the scale 14 and held in place by the hat clip mount 50. Thereafter, the indicator 16 and scale 14 are attached to the mounting cover 12. In addition, the upper end of the scale 14 is fixed to the front surface of the quill stop bar 24 by a face mount 52.

Preferably, the face mount 52 is attached to the quill stop bar 24 by a screw, however, it will be appreciated that other attaching devices may be used. Again, the quill stop bar 24 is held in place by the set screw 28.

Subsequently, the entire retrofit assembly 10 is joined to the milling machine 100 by a plurality of screws which connect the connection points 132 located on the milling machine 100 and the notches 48 of the left and right sides, 36 and 38 respectively, of the mounting cover 12.

Figure 9:
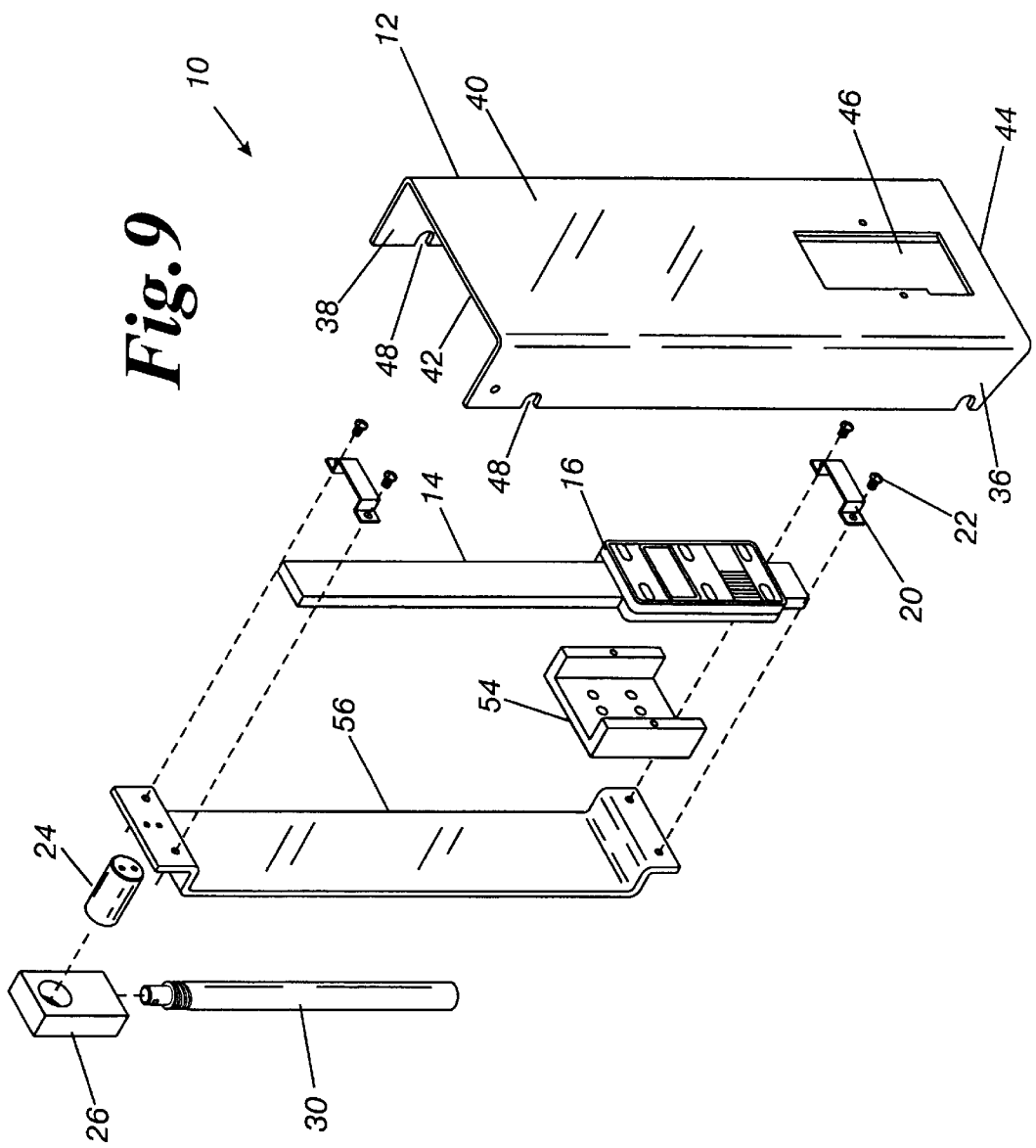
FIG. 9 is an exploded isometric view of a further alternative embodiment of the housing assembly of FIG. 3.

Another alternative embodiment of the retrofit 10 is shown in FIGS. 7 through 9. In this alternative embodiment, the retrofit apparatus 10 comprises a mounting cover 12 having a generally rectangular configuration, a main scale 14, an indicator 16, a slide support 56, a clamp mount 54, a plurality of hat clips 20, a plurality of screws 22, a cylindrical quill stop bar 24, a quill stop mount 26 which is adapted to receive the quill stop bar 24 and a cylindrical graduated rod 30.

Again, the indicator 16 generally includes an indicator head having a digital readout 32 and a plurality of control buttons 34. The indicator 16 further includes an attachment means whereby it can be secured to the main scale 14 by attachment screws. Further, the mounting cover 12 generally has a left side 36, a right side 38, a face 40, a top end 42 and a bottom end 44. Still further, the face 40 of the mounting cover 12 has a generally rectangular aperture 46 located toward the bottom end 44. The aperture 46 in the face 40 is of a corresponding size to the indicator 16. Located on the left and right sides, 36 and 38 respectively, are attachment notches 48 for attaching the retrofit apparatus 10 to the milling machine 100.

The main scale 14 has a generally rectangular configuration and is formed so that the indicator 16 can be slidably mounted thereto. The slide support 56 has a substantially hat clip configuration and has a corresponding length to the scale 14. However, the slide support 56 has a greater width than the scale 14, thus allowing the scale 14 and indicator 16 to be fixed thereto by the plurality of hat clips 20 and screws 22. Disposed between the slide support 56 and the indicator 16 is the clamp mount 54. The indicator 16, scale 14, and slide support 56 are attached to the mounting cover 12 by the clamp mount 54 so that the indicator 16 is fixed within the aperture 46 of the mounting cover 12.

After the scale 14 and indicator 16 are attached to the mounting cover 12, they are attached to the quill stop bar 24. The quill stop bar 24 is, in turn, matingly connected to the quill stop mount 26 at the upper end of its front surface. Thereafter, the graduated rod 30 is also matingly connected to the quill stop mount 26 at its bottom surface. The retrofit apparatus 10 is then fixed to the milling machine 100 in the manner previously described.

Figure 12:
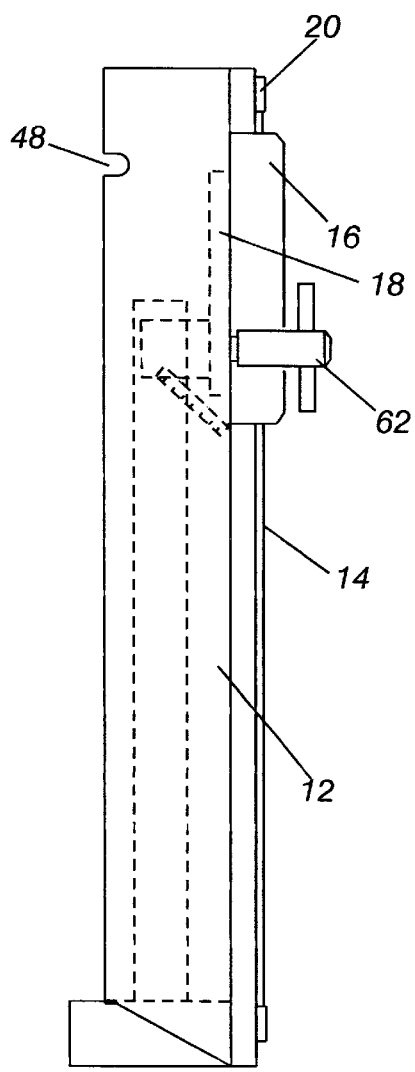
FIG. 12 is a side view of a still further alternative embodiment of the housing assembly of FIG. 3.
Figure 13:
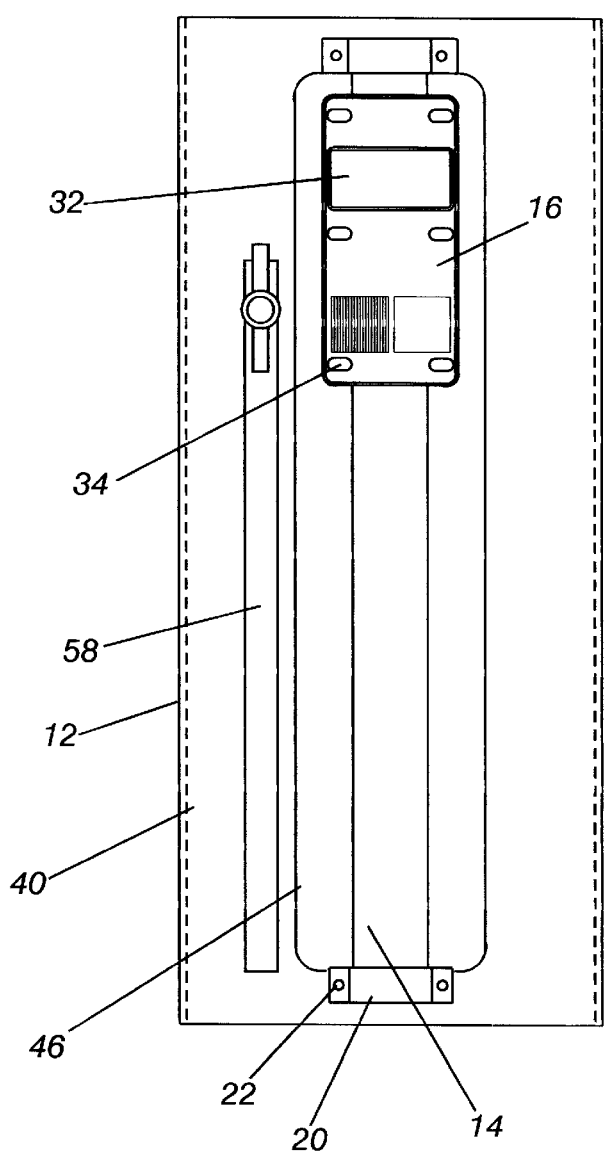
FIG. 13 is a fragmentary side view of the still further alternative embodiment of the housing assembly of FIG. 12.
Figure 14:
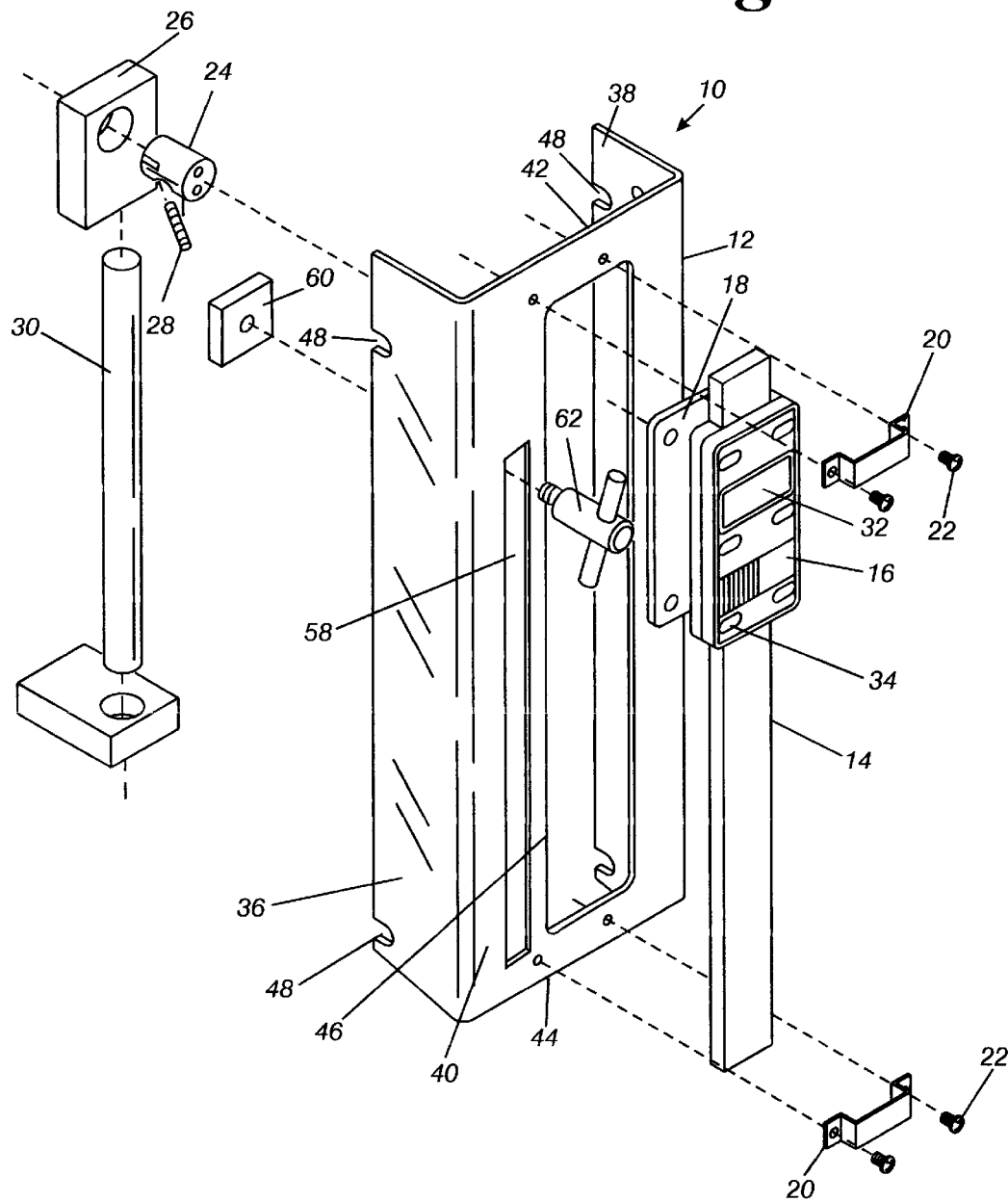
FIG. 14 is a front view of the still further alternative embodiment of the housing assembly of FIG. 12.

Referring to FIGS. 12–14, a still further embodiment of the present invention of the present invention is shown. In this embodiment, a second generally elongated aperture 58 is present along side the aperture 46. The second aperture 58 is of a shorter length and runs parallel to the aperture 46. Displaced within the second aperture 58 is a hard stop block 60 having a T-bolt configuration. The hard stop block 60 has an additional lock lever 62 which, when engaged allows a user to set the block 60 along the second aperture 58 at a predetermined point. In operation, the user moves the hard stop block 60 to a desired location on the second aperture 58 and locks it in place by engaging the lock lever 62. Thereafter, once the quill 116 is extended, the rear plate 18 contacts the hard stop block 60 and resists further extension. This feature allows the user to mill multiple workpieces at a consistent depth.

SUMMARY OF THE ACHIEVEMENT OF THE OBJECTS OF THE INVENTION

From the foregoing, it is readily apparent that I have invented a retrofit apparatus for economically measuring the vertical movement of a quill during operation.

It is further apparent that I have invented an apparatus that can be adapted and retrofitted to various milling machines wherein said apparatus can provide a more precise measurement of the vertical travel of a quill during operation.

It is further apparent that I have invented a sturdy and durable retrofit apparatus for measuring the vertical movement of a quill during operation which is superior to current assemblies used in the art.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A housing retrofit assembly for use on a milling machine, wherein the milling machine includes a frame presenting a quill head, a quill supported on the head for rotation and for selective movement along a generally vertical axis between retracted and extended positions, and manually actuated lever supported on the head and operatively connected to the quill for moving the quill between the retracted and extended positions, the assembly comprising:

a mounting cover having an elongated, centrally located aperture;

a scale slidably mounted to the mounting cover;

an indicator for measuring the displacement of the quill as the quill is moved between the retracted and extended positions, the indicator providing a digital reading of the vertical displacement of the quill from a starting position;

a slide support for attachment to said scale having a plurality of holes located on opposing ends of said support thereby enabling connection to a quill stop bar, said stop bar having a cylindrical configuration and being adapted to be fixed to the support at one end and be matingly engaged to a quill stop mount at an opposing end;

a clamp mount disposed between said support and said scale, wherein said clamp mount is attached to the mounting cover by an attachment means; and a cylindrical graduated rod which is matingly secured to the quill stop mount, wherein said graduated rod vertically moves responsive to the movement of a quill device thereby causing the scale to slidably move along the indicator.

2. The housing retrofit assembly for use on a milling machine according to claim 1, wherein the assembly further comprises:

a stop bar fixedly secured to said scale by an attachment means a quill shaft matingly engaged to said stop bar by a quill mount; and wherein the quill shaft is attached to the quill of the milling machine and vertically moves responsive to a force placed thereon, thereby causing said scale to slide up and down along the indicator.

3. A housing retrofit assembly for use on a milling machine according to claim 1, wherein the mounting cover is made of aluminum.

4. A housing retrofit assembly for use on a milling machine according to claim 1, wherein the mounting cover is made of steel.

5. A housing retrofit assembly for use on a milling machine according to claim 1, further comprising a set screw, the quill stop bar having a cavity for receiving a set screw, the quill stop bar being matingly engaged to the quill stop mount at one end thereof by the set screw which is received in the cavity in the stop bar.

6. A housing retrofit assembly for use on a milling machine according to claim 5 wherein the cavity in the quill stop bar is angular.

7. A retrofit apparatus for measuring the vertical movement of a quill on a milling-machine, said retrofit comprising:

- a mounting cover having a left side, a right side, a face, a top end and a bottom end, wherein said mounting cover has a generally rectangular configuration and a plurality of attachment notches for attaching the cover to the milling machine;
- a generally rectangular aperture located on said face;
- a main scale for slidable engagement with an indicator, said indicator consisting of a digital readout display of units of measure;
- a slide support for attachment to said scale having a plurality of holes located on opposing ends of said support thereby enabling connection to a quill stop bar, said stop bar having a cylindrical configuration and being adapted to be fixed to the slide support at one end and be matingly engaged to a quill stop mount at an opposing end;
- a clamp mount disposed between said support and said scale, wherein said clamp mount is attached to the mounting cover by an attachment means; and
- a cylindrical graduated rod which is matingly secured to the quill stop mount, wherein said graduated rod vertically moves responsive to the movement of a quill device thereby causing the scale to slidably move along the indicator.

8. A retrofit apparatus for measuring the vertical movement of a quill on a milling machine according to claim 7, wherein the mounting cover is made of steel.

9. A housing retrofit assembly for use on a milling machine, wherein the milling machine includes a frame presenting a quill head, a quill supported on the head for rotation and for selective movement along a generally vertical axis between retracted and extended positions, and a manually actuated lever supported on the head and operatively connected to the quill for moving the quill between the retracted and extended positions, the assembly comprising:

- a housing having a first elongated, centrally located aperture;
- a scale slidably mounted to the housing;
- an indicator for measuring the displacement of the quill as the quill is moved between the retracted and extended positions, the indicator providing a digital reading of the vertical displacement of the quill from a starting position;
- a second generally elongated aperture located alongside the first aperture, wherein the length of the second aperture is shorter than that of the first aperture; and
- a hard stop lock having a T-bolt configuration is slidably mounted within the second aperture for allowing a user to preset a milling depth of the quill.

10. A housing retrofit assembly for use on a milling machine according to claim 9, wherein the housing is made of steel.

11. A housing retrofit assembly for use on a milling machine according to claim 9, further comprising a set screw, the quill stop bar having a cavity for receiving a set screw, the quill stop bar being matingly engaged to the quill stop mount at one end thereof by the set screw which is received in the cavity in the stop bar.

12. A housing retrofit assembly for use on a milling machine according to claim 11 wherein the cavity in the quill stop bar is angular.

* * * * *